US006246465B1

(12) United States Patent
Suzuki et al.

(10) Patent No.: US 6,246,465 B1
(45) Date of Patent: Jun. 12, 2001

(54) PRESSURE-SENSITIVE AND HEAT-SENSITIVE IMAGE TRANSFER APPARATUS FOR RECORDING

(75) Inventors: Minoru Suzuki, Tochigi; Hiroshi Orita; Hiroyuki Saito, both of Saitama; Katsuyoshi Suzuki; Koichi Furusawa, both of Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/231,801

(22) Filed: Jan. 15, 1999

(30) Foreign Application Priority Data

Jan. 16, 1998 (JP) ................................................ 10-020324

(51) Int. Cl.$^{7}$ ..................................................... G03B 27/00
(52) U.S. Cl. ............................................. 355/400; 355/406
(58) Field of Search ..................................... 355/400, 406, 355/27, 37; 396/583, 66; 430/138, 203, 253; 101/171

(56) References Cited

U.S. PATENT DOCUMENTS

| | | | | |
|---|---|---|---|---|
| 4,399,209 | | 8/1983 | Sanders et al. . | |
| 4,440,846 | | 4/1984 | Sanders et al. . | |
| 4,644,376 | | 2/1987 | Usami et al. . | |
| 5,246,811 | * | 9/1993 | Higuchi | 430/138 |
| 5,828,926 | * | 10/1998 | Iwata et al. | 399/66 |
| 5,884,114 | * | 6/1999 | Iwasaki | 396/583 |

FOREIGN PATENT DOCUMENTS 4-4960 1/1992 (JP) .

* cited by examiner

*Primary Examiner*—Russell Adams
*Assistant Examiner*—Peter B. Kim
(74) *Attorney, Agent, or Firm*—Greenblum & Bernstein, P.L.C.

(57) ABSTRACT

An image transfer apparatus that records an image through selective heat and pressure application has an ink ribbon and a film disposed between a driving head and a flat platen. Color dyes of the ink ribbon are transferred to the film as the image. The image on the film is thus conveyed to a position for transferring the image to a recording sheet. The film and the recording sheet are pressed between a transfer roller and a conveyer roller with a pressure that sufficiently smoothes unevenness in the surface of the recording sheet. A high quality image is thus recorded on the recording sheet regardless of the surface condition of the recording sheet.

28 Claims, 8 Drawing Sheets

PRESSURE-SENSITIVE AND HEAT-SENSITIVE IMAGE TRANSFER APPARATUS FOR RECORDING

BACKGROUND OF THE INVENTION

1. Field of the Invention

The present invention relates to an image transfer apparatus used in a high-resolution printer for pressure-sensitive and heat-sensitive recording of an image on a recording sheet, and more particularly for recording an image by locally pressing and selectively heating a recording material that includes capsule.

2. Description of the Related Art

An ink is known that includes fine capsules, such as micro-capsules, filled with heat-sensitive color developing dye or ink for high-resolution printing in a high resolution color printer. A recording sheet consists of a base sheet with a layer of the micro-capsules covering the base sheet. The layer of micro-capsules includes a plurality of types of micro-capsule, each type corresponding to a specific color ink or dye, which seeps from the micro-capsule onto the recording sheet when the corresponding micro-capsule is heated to a predetermined temperature. The predetermined temperature varies dependent on the type of micro-capsule. Each seeped color ink or dye is developed and fixed by light of a predetermined wavelength, which also varies dependent on the type of micro-capsule. Therefore, each type of micro-capsule seeps a predetermined color ink or dye when heated to the predetermined temperature, and the seeped color is developed and fixed on the base sheet by irradiation with the light of the specific wavelength. Thus, ink or dye discharge to generate a full-color image, to be recorded on a recording sheet, can be controlled through selection of the micro-capsules to seep the dye or ink, which occurs through control of a localized heating and irradiation with a specific wavelength of light.

The recording process utilizing the recording sheet with the layer of the micro-capsules is complicated and time-consuming, because the localized heating and light irradiation must be repeatedly executed in order to develop and fix a plurality of colors. When the base sheet is a normal sheet of plain paper, it becomes difficult to record a high-resolution image on the base sheet, because the normal paper usually has an uneven printing surface.

SUMMARY OF THE INVENTION

Therefore, an object of the present invention is to provide a pressure-sensitive and heat-sensitive image transfer apparatus for easily recording a full-color high-resolution image on a recording sheet through control of localized pressure and temperature, regardless of a surface condition of the recording sheet.

An image transfer apparatus according to the present invention comprises an image generating unit that includes an image carrying member and a layer of micro-capsules containing dye, each micro-capsule disposed in the layer of micro-capsules exhibits a temperature/pressure characteristic such that, when the each micro-capsule is squashed under a corresponding predetermined pressure at a corresponding predetermined temperature, the dye seeps from the squashed micro-capsule and transfers to a surface of the image carrying member. An image transfer unit is also included that transfers the transferred dye as the image to a recording surface of a recording sheet.

Preferably a shell wall of the each micro-capsule is composed of a shape memory resin which exhibits a glass-transition temperature corresponding to the corresponding predetermined temperature, and a thickness of the shell wall corresponding to the corresponding predetermined pressure. Further the image transfer apparatus may include a pressing unit that presses the recording surface of the recording sheet such that the recording surface is smoothed to improve a quality of said transferred image. Also the image transfer apparatus may include a pressure application system that locally applies a predetermined pressure to the micro-capsule layer. At least one of the predetermined pressures is the corresponding predetermined pressure. A heat application system may be also included that selectively and locally heats the micro-capsule layer to predetermined temperatures. At least one of the predetermined temperatures is the corresponding predetermined temperature. The image transfer apparatus may include a capsule holding member holding the layer of micro-capsules and a recording sheet transport unit moving the recording sheet in a transport direction.

Preferably the image generating unit selectively and locally squashes and breaks the micro-capsules between the image carrying member and the capsule holding member in accordance with a control of the heat application system and the pressure application system. Further, the image carrying member may include a continuous belt, and the image generating unit may include a rotational drive system rotationally driving the continuous belt. Furthermore, the image generating unit includes a support member that supports the capsule holding member, and the image carrying member during the application of the predetermined pressures and temperatures. The image transfer unit may include a roller rotating in synchronization with a movement of the continuous belt. The roller may press the recording sheet to resiliently contact the image carrying member such that the transferred dye is accurately transferred to the recording sheet as the image.

Preferably, the image carrying member includes a platen roller, and the image transfer unit includes a rotational drive system rotationally driving the platen roller in synchronization with the movement of the recording sheet and a second roller. The second roller may presses the recording sheet to resiliently contact the image carrying member, such that the transferred dye is accurately transferred as the image to the recording sheet. Preferably, the capsule holding member disposed on the image carrying member and the image generating unit further includes an adhesion preventing member coated with a releasant that prevents adhesion of the transferred dye. Also preferably, the image generating unit selectively and locally squashes and breaks the micro-capsules between the image carrying member and the adhesive preventing member in accordance with a control of the heat application system and the pressure application system. Further, the image carrying member may include a transport drive system that drives the image carrying member so that the transferred dye is transferred as the image to the recording surface of the recording sheet. The image carrying member may be in resilient contact with the adhesion preventing member such that the adhesion preventing member rotates in synchronization with the image carrying member. Furthermore, the image transfer unit includes a rotating member that rotates in synchronization with the image carrying member. The rotating member may press the recording sheet to resiliently contact the recording surface with the capsule holding member such that the transferred dye is accurately transferred as the image to the recording surface.

An image transfer apparatus according to the present invention comprises a conveyor unit that intermittently moves a recording sheet in a transport direction, an ink-transfer ribbon that comprises a base member and a layer of micro-capsules, coated over the base member. The layer of micro-capsules contains a plurality of micro-capsules filled with dye, a shell wall of each micro-capsule of the plurality of micro-capsules being composed of resin that exhibits a temperature/pressure characteristic such that, when the each micro-capsule is squashed under a corresponding predetermined pressure at a corresponding predetermined temperature, the dye discharges from the squashed micro-capsule and transfers as the image to a recording surface of the recording sheet. A thermal head unit, performing a line by line printing operation on the base member in a recording direction substantially perpendicular to the transport direction, is included that includes a temperature application the selectively and locally heating the layer of micro-capsules to predetermined temperatures and a pressure application unit locally applying predetermined pressures to the layer of micro-capsules. The predetermined temperatures include the corresponding predetermined temperature and the predetermined pressures include the corresponding predetermined pressure. A continuous belt having a smooth outer surface is also included that resiliently contacts the layer of micro-capsules and the recording surface of the recording sheet. The continuous belt moves in synchronization with the movement of the recording sheet such that the transfer of the image to the recording surface of the recording sheet occurs.

Preferably, the plurality of micro-capsules filled with dye includes at least three types of micro-capsules that have a different shell wall breaking under the corresponding predetermined pressure at the corresponding predetermined temperature and a corresponding different color dye.

An image transfer apparatus according to the present invention comprises a conveyor unit that moves a recording sheet in a transport direction, an ink-transfer ribbon that comprises a base member and a layer of micro-capsules, coated over the base member. The layer of micro-capsules contains a plurality of micro-capsules filled with dye, a shell wall of each of the plurality of micro-capsules being composed of a resin that exhibits a temperature/pressure characteristic such that, when the each micro-capsule is squashed under a corresponding predetermined pressure at corresponding predetermined temperature, the dye discharges from the squashed micro-capsule and transfers as the image to a recording surface of the recording sheet. A thermal head unit, performing a printing operation on the base member, is included that includes a temperature application unit selectively and locally heating the layer of micro-capsules to predetermined temperatures and a pressure application system locally applying predetermined pressures to the layer of micro-capsules. The predetermined temperatures include the corresponding predetermined temperature and the predetermined pressures include the corresponding predetermined pressure. A rotating member having a smooth outer surface is also included that resiliently contacts the layer of micro-capsules and the recording surface of the recording sheet. The rotating member moves in synchronization with the movement of the recording sheet such that the transfer of the image to the recording surface of the recording sheet occurs.

Preferably, the conveyor unit intermittently moves the recording sheet, and the thermal head performs a line by line printing operation on the base member in a recording direction substantially perpendicular to the transport direction. The thermal head and the ink-transfer ribbon may extend in parallel across substantially a width of the recording sheet. The plurality of micro-capsules filled with dye may include at least three types of micro-capsules that have a different shell wall breaking under the corresponding predetermined pressure at the corresponding predetermined temperature and a corresponding different color dye. The thermal head may be tangentially aligned with the rotating member such that the predetermined pressures are applied by the pressure application system due to the alignment.

An image transfer apparatus according to the present invention comprises a conveyor unit that moves a recording sheet in a transport direction, an ink-transfer ribbon that comprises a base member and a layer of micro-capsules, coated over the base member. The layer of the micro-capsules contains a plurality of micro-capsules filled with dye, a shell wall of each micro-capsule of said plurality of micro-capsules being composed of a resin that exhibits a temperature/pressure characteristic such that, when each of the plurality of micro-capsules is squashed under a corresponding predetermined pressure at a corresponding predetermined temperature, the dye discharges from the squashed micro-capsule and transfers as the image to a recording surface of the recording sheet. A thermal head unit, performing a printing operation on the base member, is included that includes a temperature application unit selectively and locally heating the layer of micro-capsules to predetermined temperatures and a pressure application system locally applying predetermined pressures to the layer of micro-capsules. The predetermined temperatures include the corresponding predetermined temperature and the predetermined pressures include the corresponding predetermined pressure. A first rotating member, having a releasant coated outer surface, is also included that resiliently contacts the ink-transfer ribbon as a part of the pressure application system. A second rotating member is also included that resiliently contacts the layer of micro-capsules to the recording surface of the recording sheet. The second rotating member moves in synchronization with the movement of the recording sheet such that the transfer of the image to the recording surface of the recording sheet occurs.

Preferably, the conveyor unit intermittently moves the recording sheet, and the thermal head performs a line by line printing operation on the base member in a recording direction substantially perpendicular to the transport direction. The thermal head and the ink-transfer ribbon may extend in parallel across substantially a width of the recording sheet. And the plurality of micro-capsules filled with dye may include at least three types of micro-capsules that have a different shell wall breaking under the corresponding predetermined pressure at the corresponding predetermined temperature and a corresponding different color dye. The thermal head may be tangentially aligned with the first rotating member such that the predetermined pressures are applied by the pressure application system due to the alignment.

BRIEF DESCRIPTION OF THE DRAWINGS

The present invention will be better understood from the description of the preferred embodiments of the invention set forth below together with the accompanied drawings, in which.

DESCRIPTION OF THE PREFERRED EMBODIMENT

Hereinafter, the preferred embodiments of the present invention are described with reference to the attached drawings.

Figure 1:
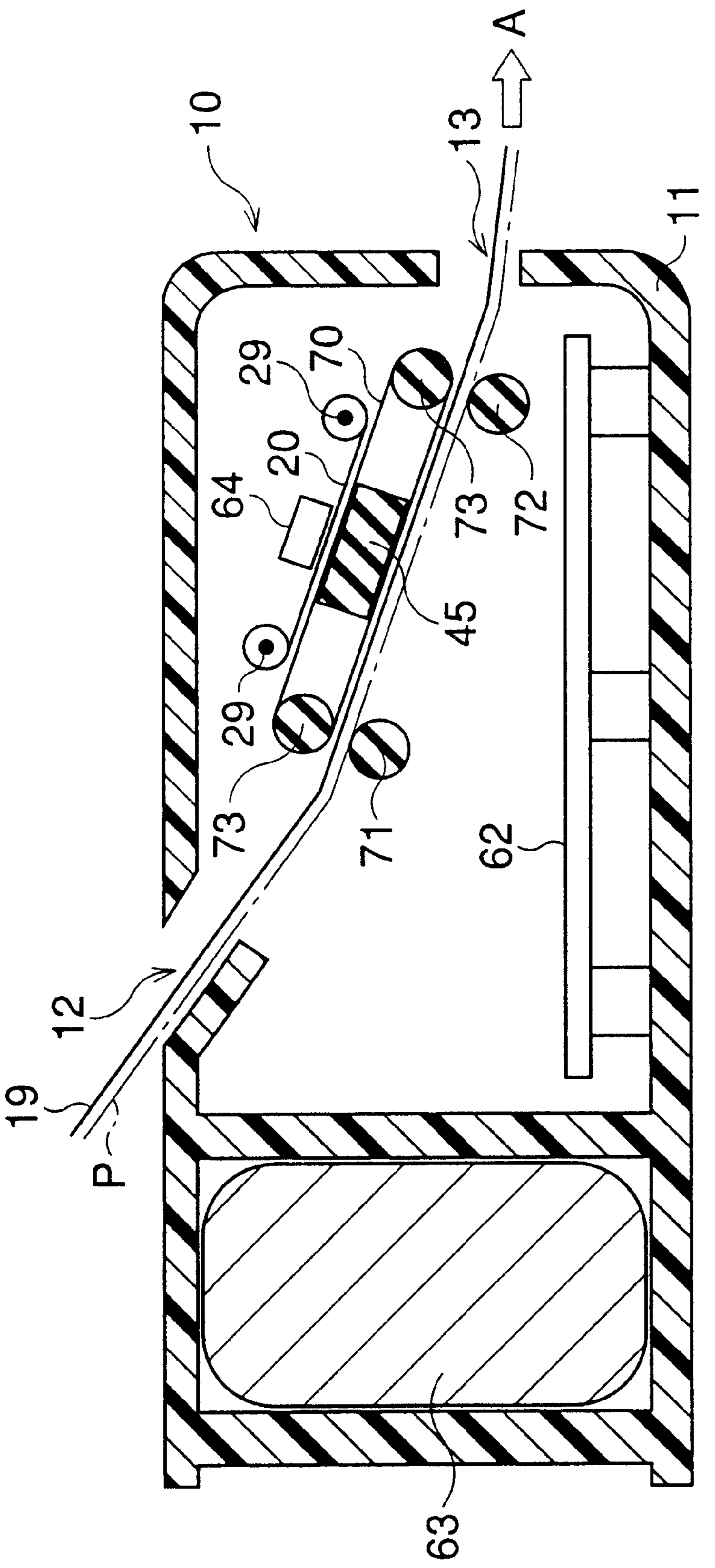
FIG. 1 is a cross-sectioned elevational view showing a high-resolution color printer of a first embodiment for pressure-sensitive and heat-sensitive recording.

FIG. 1 is a cross-sectioned elevational view of a high-resolution color printer 10 for pressure-sensitive and heat-sensitive recording of a full-color image on a recording sheet 19.

The color printer 10 is a serial printer comprising a housing 11, which is rectangular parallelepiped in a longitudinal direction ("line direction", hereinafter) being perpendicular to a longitudinal direction of the recording sheet 19.

A pair of continuous-belt rollers 73 are disposed over a recording path P, along which the recording sheet 19 is transported after being inserted in the inlet slit 12 until ejection from the outlet slit 13, within the housing 11. The rollers 73 are rubber rollers that tension and drive a continuous belt 70 engaged therearound. The belt 70 is a film made of, for example, resin, or a suitable metal, with a width substantially equal to that of the recording sheet 19. A driving head 64 that generates an image via selective and localized heat and pressure is disposed over the belt 70, and a rectangular flat platen 45, made of rubber is disposed parallel to the belt within an area bounded by the belt 70. The driving head 64 moves in the line direction, driven by a driving apparatus (not shown). The flat platen 45 extends along the belt 70, in the line direction, so as to support the pressure of the driving head 64. The surface of the belt 70 is smoother than the surface of the recording sheet 19, being of normal or plain paper, and due to the smooth surface, no discharged ink or dye is fixed thereon and all discharged ink or dye transfer accurately to the recording sheet 19.

An ink ribbon 20 having a layer of micro-capsules is disposed above and in parallel with the belt 70, and has a width substantially equal to the width of the belt 70. The ink ribbon 20 is wound around a pair of spool spindles 29, and runs from one spindle to the other as the spindles 29 rotate.

Under the path P, there are disposed a transfer roller 71 corresponding and parallel to the conveyer roller 73 at the insert slit 12 side, and a sheet-feeding roller 72 corresponding and parallel to the conveyer roller 73 at the outlet slit 13 side. The recording sheet 19 and the belt 70 are vertically supported, by the rollers 73 and 71 upstream of the driving head 64, and by the rollers 73 and 72 downstream of the driving head 64 and by a guide plate (not shown) disposed between the rollers 71 and 72. The recording sheet 19 is conveyed by the rollers 71, 72 and 73 in the direction A along the guide plate.

The spools 29, and the rollers 71, 72 and 73 are driven at predetermined speeds by a motor, such as a stepping motor or the like (not shown). The driving apparatus for the driving head 64, and the motor for the spools 29 and rollers 71 to 73 are controlled by a controller (not shown), which is mounted on a printed circuit board 62 on a lower inner surface of the housing 11. A battery 63 for supplying electric power to the components of the color printer 10, such as the motor and the control circuit, is disposed in a compartment of the housing 11 at a side opposite to the surface with the outlet slit 13.

Figure 2:
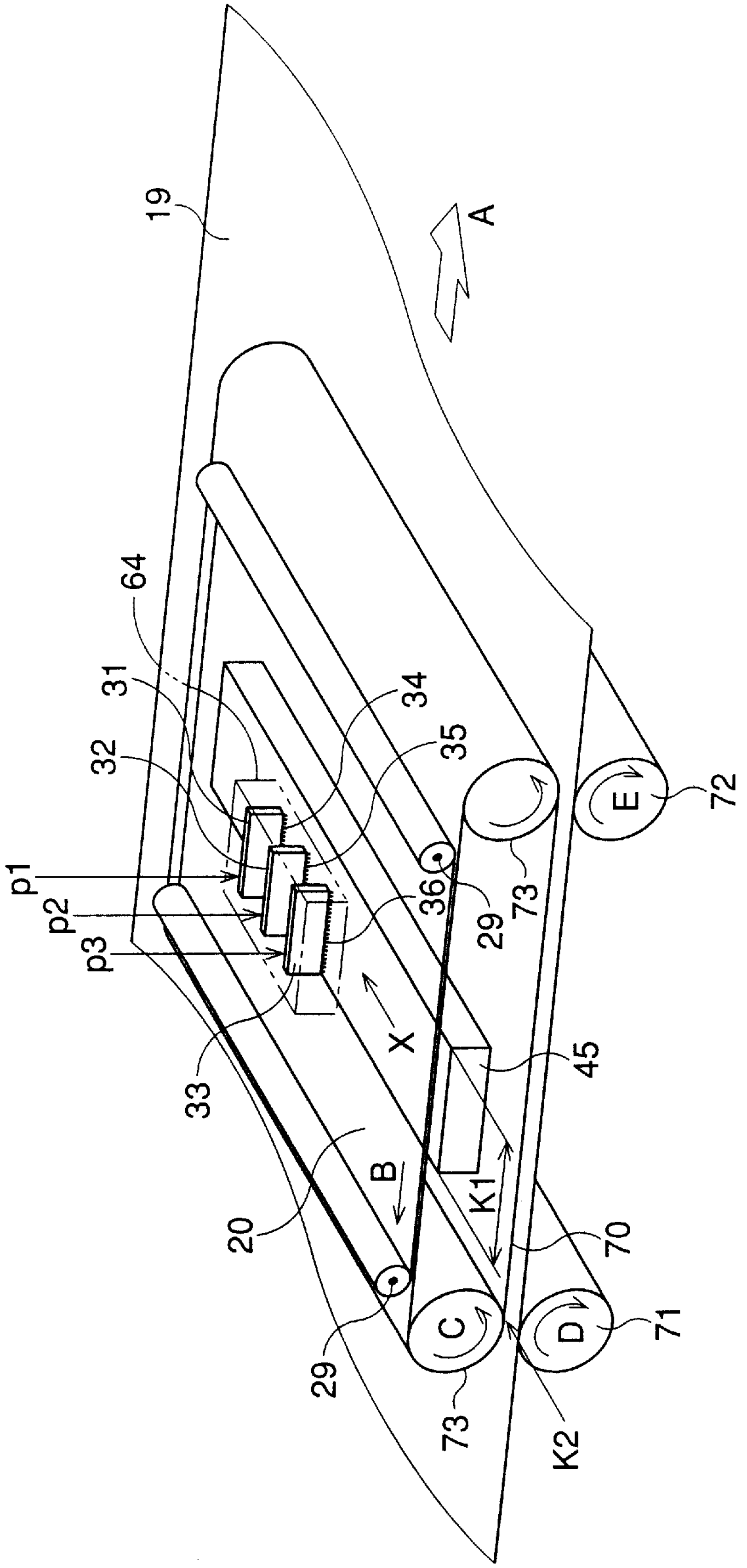
FIG. 2 is a perspective view showing a transfer apparatus used in the color printer.

The image transfer apparatus used in the first embodiment of the color printer is described with reference to FIG. 2. FIG. 2 is a conceptual view of the printer 10.

The driving head 64 is provided with thermal heads 31, 32 and 33 which are resiliently biased to contact an interposed recording sheet 19 at different pressures p1, p2 and p3, respectively, by means of spring units (not shown). The thermal head 31 is provided with a plurality of heating elements 34 aligned in the direction A, which is heated to a predetermined temperature t1. Similarly, the thermal heads 32 and 33 are provided with a plurality of heating elements 35 and 36, respectively, which are heated to respective predetermined temperatures t2 and t3. The temperatures t1, t2 and t3 are different from one another. The heating elements 34, 35 and 36 are heated under a control of a controller (not shown).

In this case, the thermal heads 31, 32 and 33 correspond to colors of cyan, magenta and yellow, respectively, but the number of thermal heads is determined according to a number of the types of ink or dye to be used.

The ink ribbon 20 is intermittently conveyed in a direction shown by an arrow B, and the driving head 64 is driven in a direction shown by an arrow X. The ink ribbon 20 is pressed by the thermal heads 31, 32 and 33, with the pressures p1, p2 and p3, respectively, against the belt 70, which in turn is pressed against the flat platen 45. The ribbon 20, and thus the belt 70 also, are selectively and locally heated to the temperatures t1, t2 and t3. The ink or dye thus discharges from the respective broken micro-capsules and is transferred to a surface of the belt 70. An image is thus formed on the belt 70, and hereinafter an area where the image is formed is called "imaging area" K1. Since the belt 70 is made of resin or the suitable metal, the transferred ink or dye is not fixed.

The belt 70 is transported by the conveyer rollers 73 rotating in a direction shown by an arrow C. The imaging area K1 is moved to "transfer area" K2. The transfer roller 71 rotates in synchronization with the belt-conveyer rollers 73, shown by arrow D. At the transfer area K2, the adjacent rollers 71 and 73 press the interposed recording sheet 19 and the interposed belt 70 with a pressure higher than a critical breaking pressure $P_{UL}$, being described hereinafter, which is higher than the pressures p1, p2 and p3. Since the surface of the recording sheet 19 is smoothed by the pressure, the image formed on the belt 70 is uniformly and reliably transferred to the surface of the recording sheet 19. Further, one of the rollers 71 and 73 can be heated to a temperature being higher than the temperatures t1, t2 and t3 by a heating element disposed in or near the roller (71 or 73), so that the image formed on the belt 70 is more accurately transferred to the surface or the recording sheet 19.

The recording sheet 19 is conveyed in the direction A by the rollers 71 and 73 rotating in the directions D and C, respectively, before being introduced to a nip by the guide plate (not shown) between adjacent rollers 72 and 73, rotating in directions E and C, respectively, at a synchronous speed, such that the recording sheet 19 is transported to the outlet slit 13 (FIG. 1) and ejected.

The image formed on the belt is a reflected image of a real image to be recorded on the recording sheet 19.

The temperatures t1, t2 and t3 of the heating elements 34, 35 and 36 are set to increase in order, that is, t2 is higher than t1 and t3 is higher than t2. Since the above serial color printer 10 performs a recording operation as the driving head 64 moves in the direction X, the temperatures t2 and t3 are readily obtainable by additional heating of the heating elements 35 and 36, respectively, thus making thermal control of the heating elements 34, 35 and 36 simple. Conversely, the pressures p1, p2 and p3 are set to decrease in order, that is, p2 is lower than p1 and p3 is lower than p2.

If the recording operation is to be performed during movement of the driving head 64 in direction X and also in an opposite direction, the driving head 64 should be pivotally mounted enabling the order of the heating elements 34, 35 and 36 to be maintained with respect to a required printing direction of the driving head 64. It is also possible that the order of the temperatures t1,t2 and t3 is reversed by changing a connection of the thermal heads 31, 32 and 33 with a controller (not shown). In this case, the order of the pressures p1, p2 and p3 for the thermal heads 31, 32 and 33 are also reversed.

Figure 3:
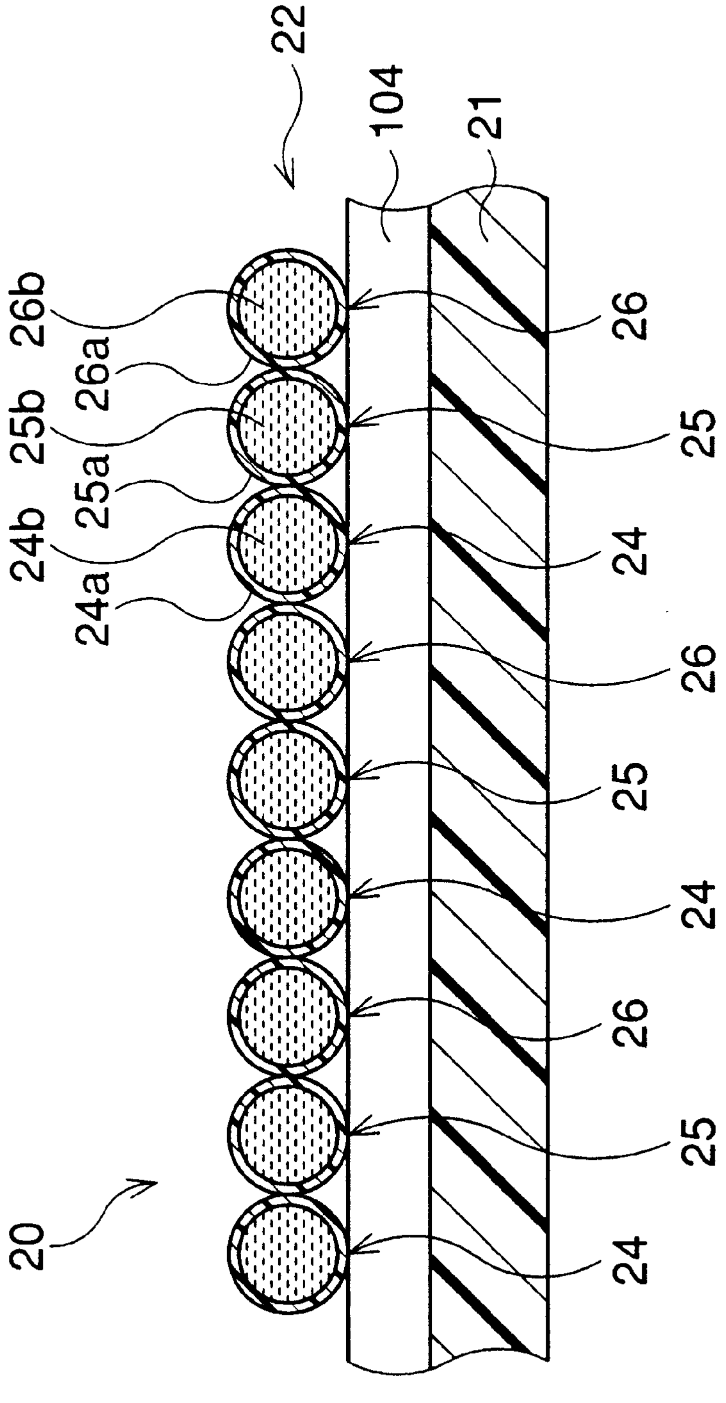
FIG. 3 is a cross-sectioned elevational view showing a structure of an ink ribbon of the color printer.

The ribbon 20 used in the pressure-sensitive and heat-sensitive color printer 10 is now described in detail with reference to FIG. 3. FIG. 3 is a cross-sectioned elevational view of the ribbon 20.

The ribbon 20 includes a base layer 21 made of, for example, PET-based resin, a capsule layer 22, and a layer of separation material 104 made of, for example, teflon-based resin or silicon-based resin interposed between the base layer 21 and the capsule layer 22.

The separation material 104 improves transferability of the ink or dye to the belt 70 as well as preventing reverse-fixing of the ink or dye on the base layer 21. The capsule layer 22 is formed on the layer of separation material 104, by a well-known method not described herein.

The capsule layer 22 includes three types of micro-capsules 24, 25 and 26, being, in this case, a cyan type of micro-capsule, a magenta type of micro-capsule and a yellow type of micro-capsule, respectively, and is disposed on the layer of the separation material 104 with a suitable binder or fixing material. The ribbon 20 is disposed adjacent to the belt 70 so that the capsule layer 22 contacts the belt 70 (FIG. 2) during a recording operation.

In FIG. 3, for the convenience of illustration, although the capsule layer 22 is shown as having a thickness corresponding to the diameter of the micro-capsules 24, 25 and 26, in reality, the three types of micro-capsules 24, 25 and 26 may overlay each other due to the formation process, and thus the capsule layer 22 may have a larger thickness than the diameter of a single micro-capsule 24, 25 or 26.

The three types of micro-capsule are described in detail with reference to FIGS. 3, 4, 5 and 6. For the material of each type of micro-capsule (24, 25, 26), a shape memory resin is utilized. For example, the shape memory resin is represented by a polyurethane-based-resin, such as polynorbornene, trans-1, 4-polyisoprene polyurethane. As other types of shape memory resin, a polyimide-based resin, a polyamide-based resin, a polyvinyl-chloride-based resin, a polyester-based resin and so on are also known.

Figure 5:
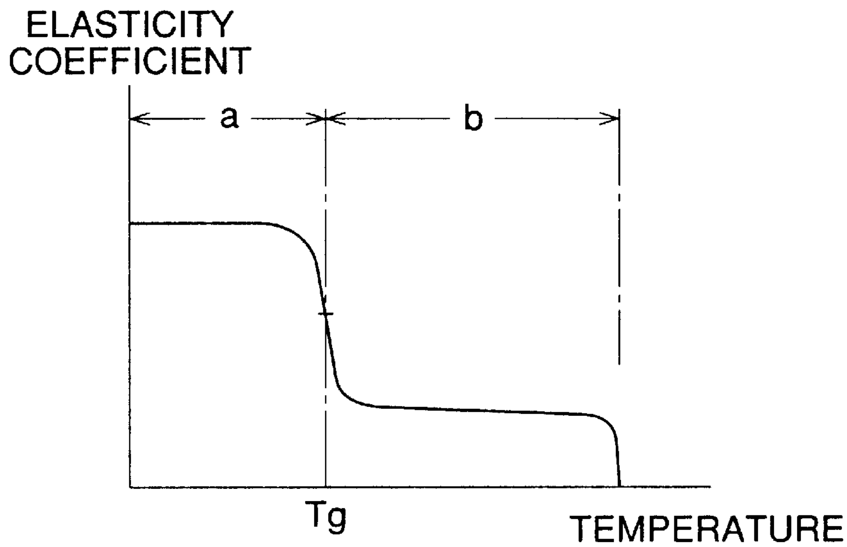
FIG. 5 is a diagram showing a characteristic relationship between temperature and elasticity coefficient of a shape memory resin of the micro-capsules.

In general, as shown in a graph of FIG. 5, the shape memory resin exhibits a coefficient of elasticity, which abruptly changes at a glass-transition temperature boundary Tg. In the shape memory resin, Brownian movement of the molecular chains is stopped in a low-temperature area "a", which is less than the glass-transition temperature Tg, and thus the shape memory resin exhibits a glass-like phase. On the other hand, Brownian movement of the molecular chains becomes increasingly energetic in a high-temperature area "b", which is higher than the glass-transition temperature Tg, and thus the shape memory resin exhibits a rubber elasticity.

The shape memory resin is named due to the following shape memory characteristic: after a mass of the shape memory resin is worked into a shaped article in the low-temperature area "a", when such a shaped article is heated over the glass-transition temperature Tg, the article becomes freely deformable. After the shaped article is deformed into another shape, when the deformed article is cooled to below the glass-transition temperature Tg, the other shape of the article is fixed and maintained. Nevertheless, when the deformed article is again heated to above the glass-transition temperature Tg, without being subjected to any load or external force, the deformed article returns to the original shape.

In the ribbon 20 according to this invention, the shape memory characteristic per se is not utilized, but the characteristic abrupt change of the shape memory resin in the elasticity coefficient is utilized, such that the three types of micro-capsules 24, 25 and 26 can be selectively broken and squashed at different temperatures and under different pressures, respectively.

Figure 6:
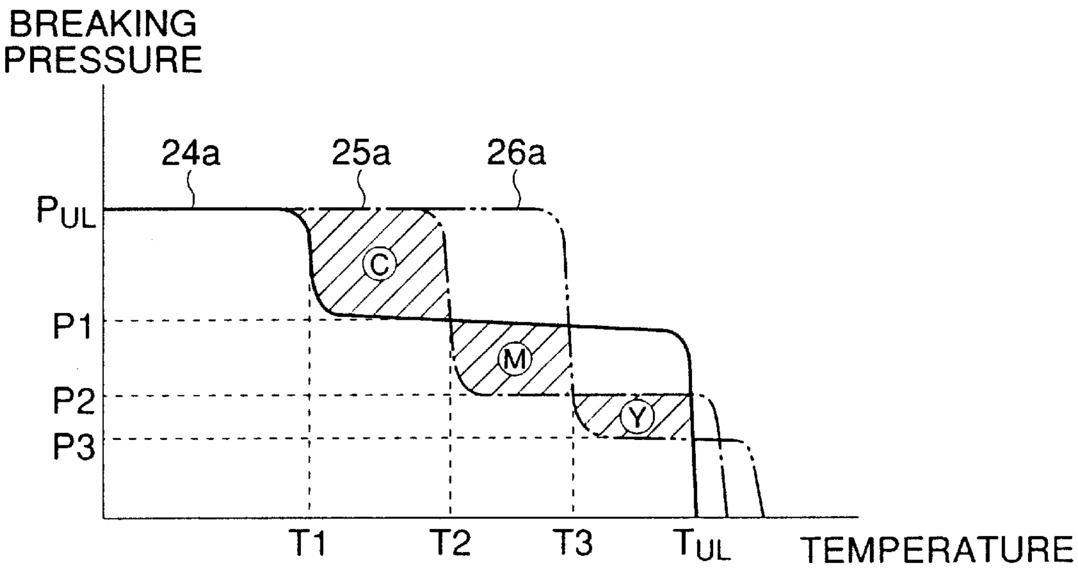
FIG. 6 is a diagram showing a characteristic relationship between temperature and breaking pressure of a capsule wall of the micro-capsules.

As shown in a graph of FIG. 6, a shape memory resin of the cyan micro-capsules 24 is prepared so as to exhibit a characteristic elasticity coefficient, indicated by a solid line (24*a*), having a glass-transition temperature T1; a shape memory resin of the magenta micro-capsules 25 is prepared so as to exhibit a characteristic elasticity coefficient, indicated by a single-chained line (25*a*), having a glass-transition temperature T2; and a shape memory resin of the yellow micro-capsules 26 is prepared so as to exhibit a characteristic elasticity coefficient, indicated by a double-chained line (26*a*), having a glass-transition temperature T3.

Note, by suitably varying compositions of the shape memory resin and/or by selecting a suitable one from among various types of shape memory resin, it is possible to obtain the respective shape memory resins, with the glass-transition temperatures T1, T2 and T3.

Figure 4:
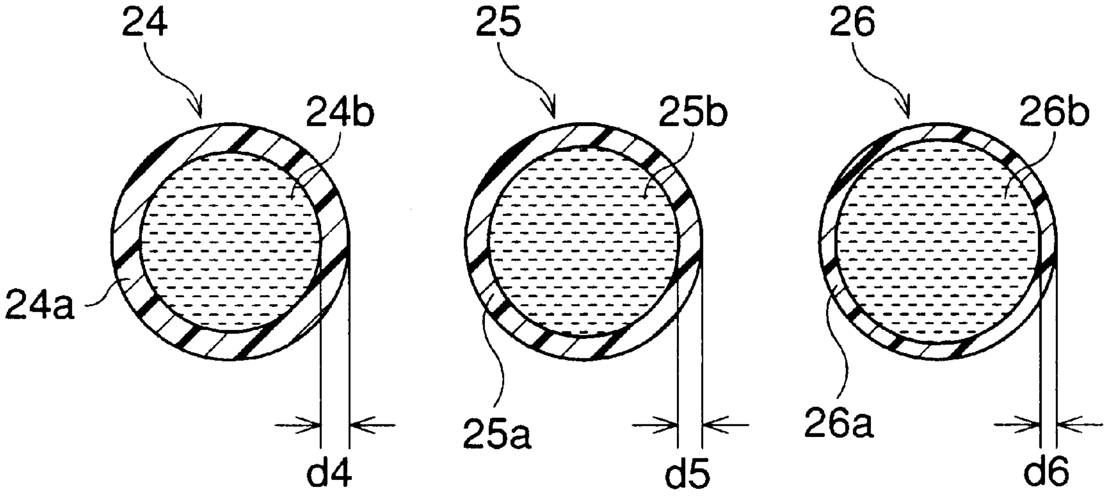
FIG. 4 is a cross-sectional view showing different types of micro-capsule utilized in the first embodiment.

As best shown in FIG. 4, the micro-capsule walls 24*a*, 25*a* and 26*a* of the cyan micro-capsules 24, magenta micro-capsules 25, and yellow micro-capsules 26, respectively, have differing thicknesses. The thickness d4 of cyan micro-capsules 24 is larger than the thickness d5 of magenta micro-capsules 25, and the thickness d5 of magenta micro-capsules 25 is larger than the thickness d6 of yellow micro-capsules 26.

Also, the wall thickness d4 of the cyan micro-capsules 24 is selected such that each cyan micro-capsule 24 is broken and compacted under a breaking pressure p1 that lies between a critical breaking pressure P1 and an upper limit pressure $P_{UL}$ (FIG. 6), when each cyan micro-capsule 24 is heated to a temperature t1 between the glass-transition temperatures T1 and T2; the wall thickness d5 of the magenta micro-capsules 25 is selected such that each magenta micro-capsule 25 is broken and compacted under a breaking pressure p2 that lies between a critical breaking pressure P2 and the critical breaking pressure P1 (FIG. 6), when each magenta micro-capsule 25 is heated to a temperature t2 between, the glass-transition temperatures T2 and T3; and the wall thickness d6 of the yellow micro-capsules 26 is selected such that each yellow micro-capsule 26 is broken and compacted under a breaking pressure p3 that lies between a critical breaking pressure P3 and the critical breaking pressure P2 (FIG. 6), when each yellow micro-capsule 26 is heated to a temperature t3 between the glass-transition temperature T3 and an upper limit temperature $T_{UL}$.

Note, the upper limit pressure $P_{UL}$ and the upper limit temperature $T_{UL}$ are suitably set in view of the characteristics of the used shape memory resins.

As is apparent from the foregoing, by suitably selecting heating temperatures t1, t2 and t3 and breaking pressures p1, p2 and p3, which should be exerted by the thermal heads 31, 32 and 33 on the ribbon 20, it is possible to selectively break and squash the cyan, magenta and yellow micro-capsules 24, 25 and 26.

For example, the heating temperature t1 and breaking pressure p1 fall within a hatched cyan area C (FIG. 6), defined by a temperature range between the glass-transition temperatures T1 and T2 and by a pressure range between the critical breaking pressure P1 and the upper limit pressure $P_{UL}$, thus only the cyan type of micro-capsule 24 is broken and squashed, thereby seeping the cyan ink or dye 24*b* (FIGS. 3 and 4). Also, the heating temperature t2 and breaking pressure p2 fall within a hatched magenta area M, defined by a temperature range between the glass-transition temperatures T2 and T3 and by a pressure range between the critical breaking pressures P2 and P1, thus only the magenta type of micro-capsule 25 is broken and squashed, thereby seeping the magenta dye or ink 25*b* (FIGS. 3 and 4). Further, the heating temperature t3 and breaking pressure p3 fall within a hatched yellow area Y, defined by a temperature range between the glass-transition temperature T3 and the upper limit temperature $T_{UL}$ and by a pressure range between the critical breaking pressures P2 and P3, thus only the yellow type of micro-capsule 26 is broken and squashed, thereby seeping the yellow dye or ink 26*b* (FIGS. 3 and 4).

Accordingly, when the heating temperatures t1, t2 and t3 of the heating elements 34, 35 and 36 are suitably controlled in accordance with digital color image-pixel signals: digital cyan image-pixel signals, digital magenta image-pixel signals and digital yellow image-pixel signals inputted to the color printer 10, it is possible to form a color image on the recording sheet 19 on the basis of the digital color image-pixel signals.

As mentioned above, in the first embodiment, the image is formed once on the belt 70 by the ink or dye 24*b*, 25*b* and 26*b* discharged from the micro-capsules 24, 25 and 26 selectively broken by the thermal heads 31, 32 and 33, applying localized pressures p1, p2, p3 and selective heating at temperatures t1, t2 and t3. The image on the belt 70 is transferred onto the recording sheet 19 by pressing the belt 70 against the recording sheet 19. Therefore, the image is transferred twice, being from the ink ribbon 20 to the belt 70 and from the belt 70 to the recording sheet 19.

If it is necessary to further smooth an uneven surface of the recording sheet 19 in order to improve the transferability of the ink or dye 24*b*, 25*b* and 26*b*, the smoothing can be performed by pre-coating. However, due to the complicated nature of the pre-coating operation, it is preferable to supply a high pressure between rollers 71 and 73 (FIG. 2) to improve a surface condition for the transfer of the ink or dye 24*b*, 25*b* and 26*b* to the recording sheet 19. Since the transfer of the ink or dye 24*b*, 25*b* and 26*b* from the belt 70 to the recording sheet 19 is independent of the forming of the image on the belt 70, the pressure for a high-accuracy transfer of the image from the belt 70 to the recording sheet 19 is not limited by the critical breaking pressures P3 to $P_{UL}$ of the capsules 24, 25 and 26.

If excessive pressure were supplied to the ribbon 20, selective breaking of the micro-capsules would be impossible, and an exact image would not be producible.

In the first embodiment, the recording sheet 19 can be pressed with a much higher pressure than the critical breaking pressure $P_{UL}$ when the image is transferred from the belt 70 to the recording sheet 19, so the unevenness of the recording sheet is sufficiently smoothed and the transferability becomes higher. Since the surface of the belt 70 is smoother than that of the recording sheet 19, the pressures p1, p2 and p3 applied to the capsule layer 22 are accurately determined and pre-set, allowing the image to be reliably generated on the belt 70.

Therefore, the transfer performance is high due to good transferability and accurate pressure application regardless of a surface condition of a recording sheet, and a high quality image is reproducible.

A second embodiment is described with reference to FIGS. 7 and 8. The second embodiment only differs from the first embodiment in that the image is transferred to the recording sheet 19 via a roller platen 74, and as such descriptions of the other identical portions are omitted.

Figure 7:
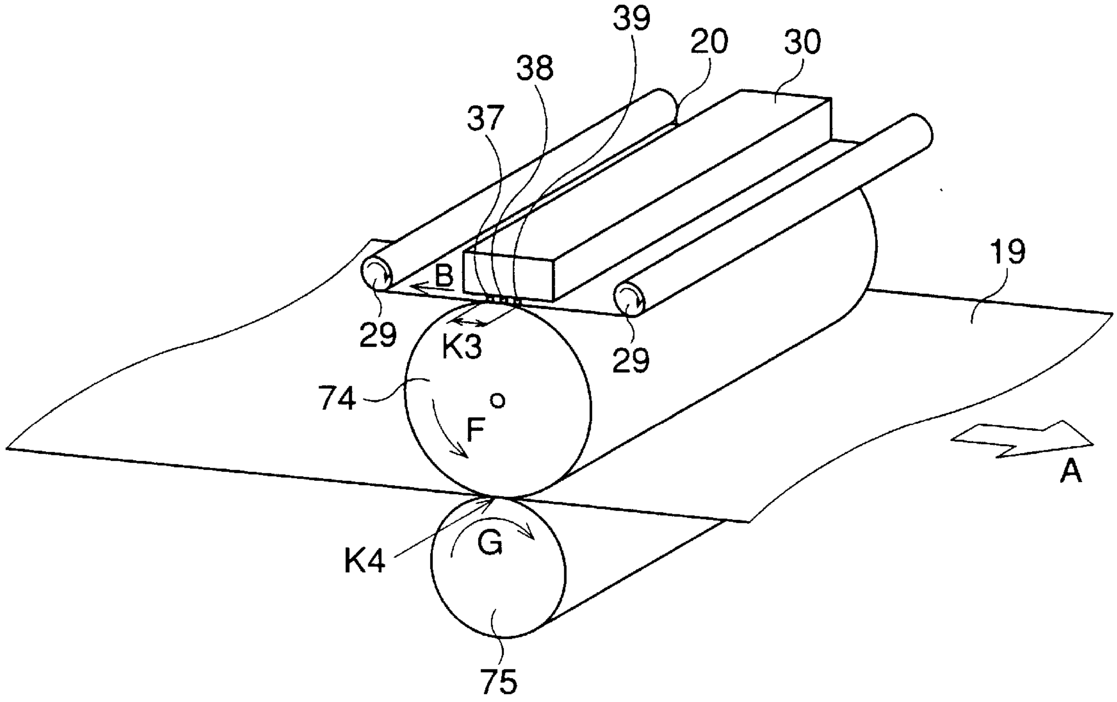
FIG. 7 is a perspective view showing a transfer apparatus of a second embodiment used in the color printer.

FIG. 7 is a conceptual view of an image transfer apparatus used in a color printer of the second embodiment. The color printer is a line printer. There is provided a thermal head 30, extending over substantially a width of the recording sheet 19, having a plurality of heating elements 37, 38 and 39 at a bottom surface thereof. The heating elements 37, 38 and 39 are linearly aligned in respective parallel rows in the lateral (line) direction of the recording sheet 19. The temperatures of the heating elements 37, 38 and 39 are set to be the glass-transition temperatures t1, t2 and t3 of the micro-capsules 24, 25 and 26, similarly to the first embodiment.

Under and in contact with the heating elements 37, 38 and 39, an ink ribbon 20 is disposed in the longitudinal direction of the recording sheet 19. The ink ribbon 20 is wound on a pair of spools 29 extending in the line direction of the recording sheet 19, and is conveyed in direction B from one spool 29 to the other spool 29, similar to the first embodiment. The roller platen 74 is provided under the ribbon 20, extending in the line direction of the recording sheet 19, and is made of a hard rubber coated with a film of resin, similar to that used in the first embodiment. The roller platen 74 may alternatively be a metal roller with a smooth surface.

An image transfer roller 75 is disposed parallel to and adjacently below the roller platen 74. The recording sheet 19, when interposed, is pressed by the image transfer roller 75 against the roller platen 74, and is transported in the direction A by the rotational movements of the transfer roller 75 and the roller platen 74. An electric motor, such as a stepping motor (not shown), drives the roller platen 74 in a rotational direction F, which in turn drives the transfer roller 75 in a direction G via frictional traction forces generated between the rollers 74, 75 and the surfaces of the recording sheet 19.

Figure 8:
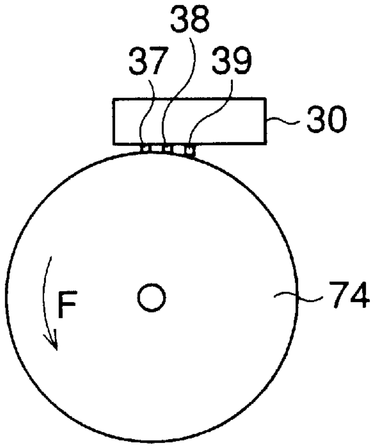
FIG. 8 is an elevational view showing a roller platen and a thermal head of the second embodiment.

FIG. 8 is an elevational view of the roller platen 74 and the thermal head 30. The thermal head 30 is tangentially aligned to an outer circumferential surface of the roller platen 74, the rows of heating elements 37, 38 and 39 being parallel to the circumferential surface of the roller platen 74. The rows of the heating elements 37 is positioned vertically above a rotational axis of the roller platen 74, and the row of the heating elements 38 and 39 are coplanar to the heating elements 37 horizontally arranged in this order offset from vertically above the rotational axis of the roller platen 74. The distance from the row of heating elements 37 to the heating elements 39 is greater than the distance to the row of heating elements 38. The clearance between the thermal head 30 and the circumferential surface of the roller platen 74 increases from the position of the heating element 37 to the position of the heating element 39, and as the distance decreases, the pressure supplied to the interposed ink ribbon 20 by the heating elements 37, 38 and 39 increases. The pressure p1 applied to the ink ribbon 20 by the heating element 37 is higher than the pressure p2 applied by the heating element 38, and the pressure p2 applied by the heating element 38 is higher than the pressure p3 applied by the heating element 39. The pressures p1, p2 and p3 identically correspond to the breaking pressures p1, p2 and p3 of the micro-capsules 24, 25 and 26, similar to the first embodiment.

As shown in FIG. 7, the ink ribbon 20 is heated and pressed between the heating elements 37, 38, 39 and the roller platen 74 in an imaging area K3. The micro-capsules 24, 25, 26 held on the ribbon 20 are selectively heated to the glass-transition temperatures t1, t2, t3 and pressed by the breaking pressures p1, p2, p3, so that the ink or dye 24*b*, 25*b*, 26*b* is discharged. The ink or dye 24*b*, 25*b*, 26*b* is transferred to the roller platen 74 as an image which is then displaced to a transfer area K4 as the roller platen 74 rotates. The image is thus transferred to a recording sheet 19, which is interposed and pressed between the transfer roller 75 and the roller platen 74 with a pressure higher than the critical breaking pressure $P_{UL}$ of the micro-capsules 24, 25, 26.

Similarly to the first embodiment, the ink or dye 24*b*, 25*b*, 26*b* is discharged from the micro-capsules 24, 25, 26 due to the localized pressure application and selectively controlled heating in accordance with inputted digital image-pixel signals, and thus the image is readily reproducible. The image is transferred via two stages, being from the ink ribbon 20 to the roller platen 74 and from the roller platen 74 to the recording sheet 19. Since the recording sheet 19 is smoothed by the pressure between the rollers 74 and 75, the transferability is good. The surface of the roller platen 74, being much smoother than the surface of the recording sheet 19, enables a precise predetermined setting of the pressures p1, p2 and p3 supplied to the capsule layer 22. A fine image can thus be transferred regardless of the initial unevenness of the surface of the recording sheet 19. Further, the transfer roller 75 can be heated to a temperature being higher than the temperatures t1, t2 and t3 by a heating element which is disposed in or near the transfer roller 75, so that the image is transferred accurately to the surface of the recording sheet 19.

Alternatively, in order to simplify a structure, the belt 70 and pair of the belt-conveyer rollers 73 (FIG. 2) of the first embodiment may be substituted for the roller platen 74 in the second embodiment. Thus a printing speed is higher due to the linear arrangement of the heating elements 37, 38, 39 in the line direction across the width of the recording sheet 19, and due to the decreased number of components necessary.

Figure 9:
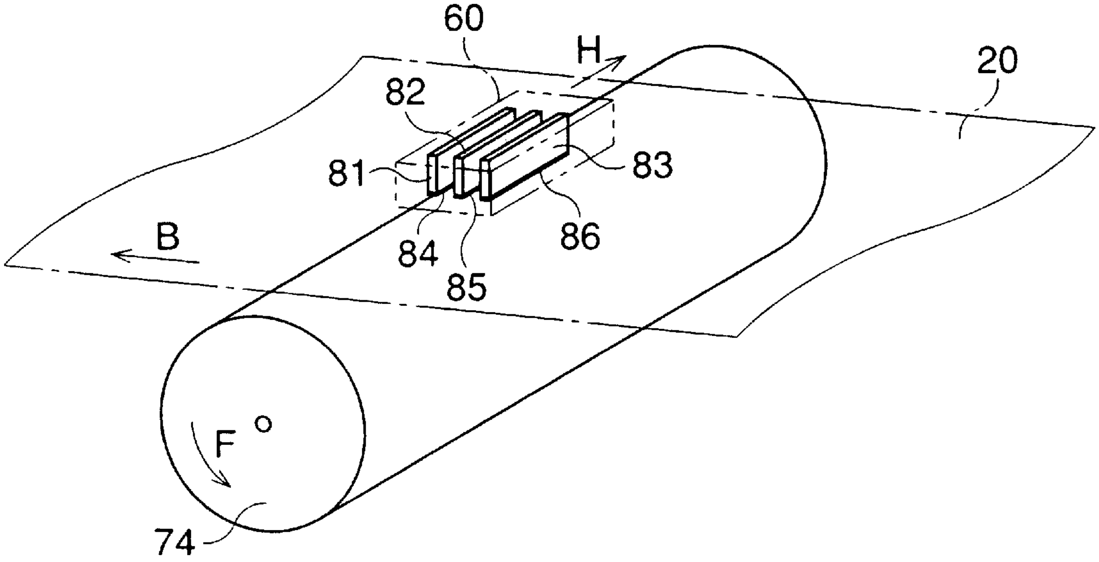
FIG. 9 is a perspective view showing a modified driving head and the roller platen of a the second embodiment used in a serial printer.

Further, the construction of the second embodiment can also be applied to a serial printer, such as that of the first embodiment, by substituting the thermal head 30 for a driving head 60, as shown as modification of the second embodiment in FIG. 9. The roller platen 74, which is intermittantly rotated by a one printing line pitch by the aforementioned motor to allow a line by line serial printing operation to be performed, is positioned beneath the driving head 60, so that the driving head 60 is in contact with the upper surface of the ink ribbon 20. The driving head 60 is movable in a direction H, similar to the line direction X in the first embodiment. The driving head 60 is provided with thermal heads 81, 82 and 83, each of which has a plurality of heating elements 84, 85 and 86, respectively, which are linearly aligned in the direction H. Thus, a printing operation can be performed serially in accordance with the second embodiment.

Figure 10:
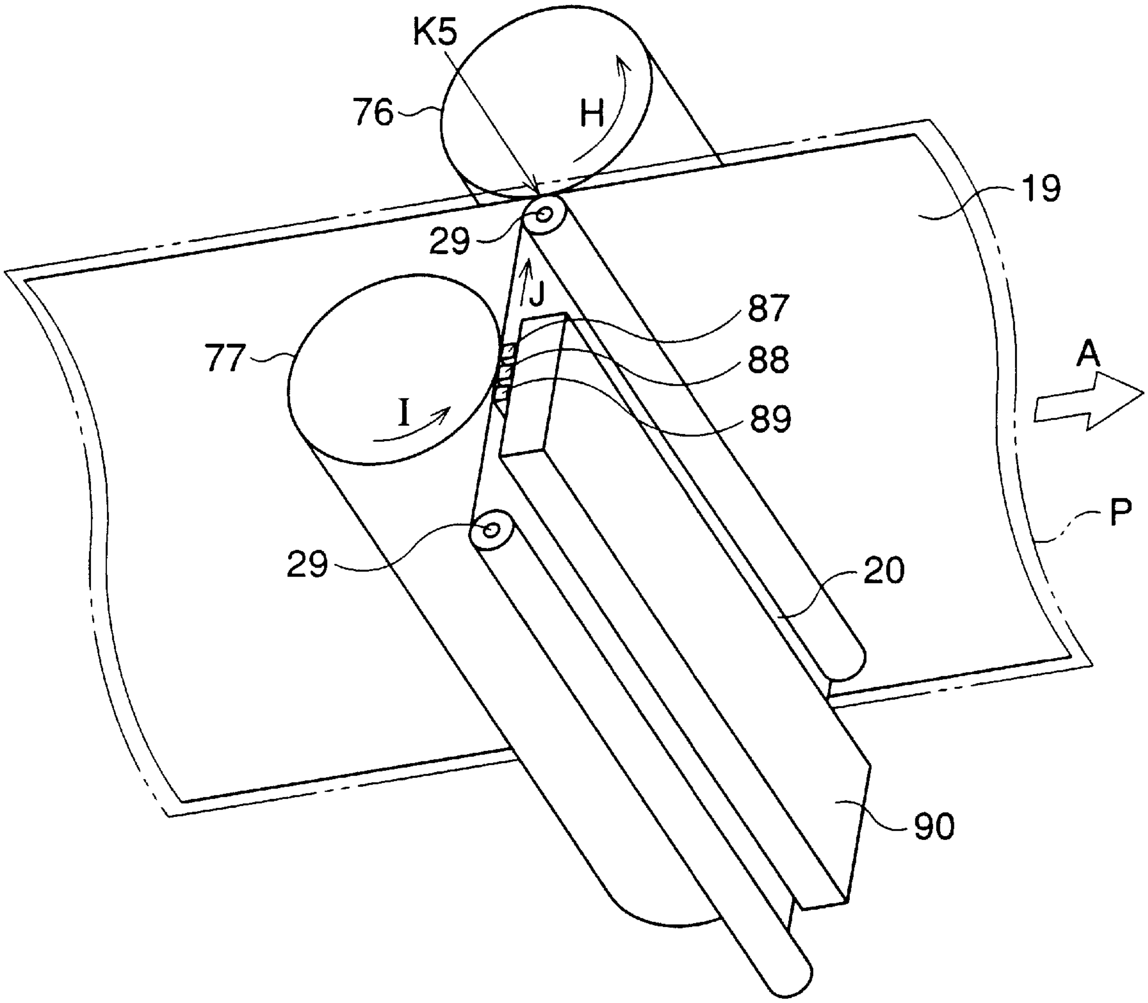
FIG. 10 is a perspective view showing a transfer apparatus of a third embodiment used in the color printer.

FIG. 10 shows a third embodiment in which an image is generated first on the ink ribbon 20. Elements and constructions similar to those of the previous embodiments have like references and descriptions are omitted. FIG. 10 is a conceptual view of an image transfer apparatus used in a color printer. A thermal head 90, an ink ribbon 20 and a platen roller 77 are disposed under the transport path P (FIG. 1). The thermal head 90 is rectangular parallelepiped, extending longitudinally in the line direction of the recording sheet 19. The thermal head 90 is disposed normal to a printing surface of the recording sheet 19, and includes three rows of plural heating elements 87, 88 and 89 linearly aligned parallel to the line direction of the recording sheet 19.

The ink ribbon 20 is provided with the layer of micro-capsules 22 and laterally extends substantially across the width of the recording sheet 19. The thermal heads 87, 88 and 89 contact the width of the ink ribbon 20, similarly to the second embodiment. The ribbon 20 is wound on a pair of spool spindles 29, disposed parallel to the line direction with the thermal head 90 interposed therebetween. The ribbon 20 is spooled in an image-transfer direction J, being perpendicular to both the line direction and the transport direction A (FIG. 1).

The roller platen 77 extends in the line direction, parallel and adjacent to the rows of heating elements 87, 88 and 89. The outer surface of the roller platen 77, being in resilient contact with the ribbon 20 under varying pressures due to the tangential alignment of the thermal head 90, similar to the second embodiment, is coated with a releasant for preventing any adhesion or transfer of the ink or dye 24*b*, 25*b*, 26*b* from the micro-capsules 24, 25 and 26. The ink ribbon 20 is pressed by the heating elements 87, 88 and 89 against the roller platen 77 with breaking pressures p1, p2 and p3, set by varying the distance between the thermal head 90 and the circumferential surface of the roller platen 77, due to the tangential positioning of the thermal head 90 with respect to the roller platen 77. The roller platen 77 rotates in a direction I, synchronous with the rotation of the spools 29, aiding conveyance of the ribbon 20 in image-transfer direction J.

An image transfer roller 76 is disposed above the path P, with rotational axes of the spools 29 and the image transfer roller 76 being parallel to each other and in vertical alignment. The recording sheet 19 is pressed by the transfer roller 76 against the ink ribbon 20 at a transfer area K5. The transfer roller 76 rotates in a direction H, due to frictional traction forces between the spool 29, surfaces of the recording sheet 19 and roller 76, enabling cooperative transportation of the recording sheet 19 in the direction A. The ink ribbon 20 is selectively and locally heated to temperatures t1, t2, t3 by the heating elements 87, 88 and 89 in accordance with inputted digital image-pixel signals, while being locally pressed with breaking pressures p1, p2, p3 by the heating elements 87, 88 and 89, respectively, against the platen roller 77. As in the previous embodiments, the micro-capsules 24, 25, 26 are selectively broken, discharging the ink or dye 24*b*,

25*b*, 26*b*. The ink or dye 24*b*, 25*b*, 26*b* does not adhere to the platen roller 77 due to the releasant coating thereon and remains on the ribbon 20.

The ink ribbon 20 complete with the selectively and locally discharged ink or dye 24*b*, 25*b*, 26*b* is conveyed in the image-transfer direction J to the area K5, so as to be transferred to the recording sheet 19. The recording sheet 19 is pressed, at the area K5 by the transfer roller 76, against the ink ribbon 20 at a normal ambient temperature, such as room temperature (approximately 25° C.) and under a pressure not greater than the critical breaking pressure $P_{UL}$ (FIG. 6). The image on the ribbon 20 is thus accurately and reliably transferred onto the recording sheet 19.

In the third embodiment, due to the ink or dye 24*b*, 25*b* and 26*b* being selectively and locally discharged from the micro-capsules 24, 25 and 26, the image is accurately and easily reproducible. The image is transferred via two stages, being the generation of the image on the ink ribbon 20, and the transfer of the image from the ink ribbon 20 to the recording sheet 19. One to the second stage occurring at generally room temperature that is lower than the glass-transition temperature T1, the unbroken micro-capsules 24, 25 and 26 on the capsule layer 22 are not broken on transfer of the image, even when subjected to a pressure at area K5 that is in the region of the critical breaking pressures P3 to $P_{UL}$, preferably in the region of the critical breaking pressures P1 to $P_{UL}$. Further, due to the smooth outer surface of the roller platen 77 and precisely set pressures p1, p2 and p3 applied by the thermal head 90, an accurate discharge of the dye or ink 24*b*, 25*b* and 26*b* on the ink ribbon 20 can be obtained, which translates into a high-quality image being formed on the recording sheet 19.

A modified construction of the third embodiment can be applied to a serial printer, such as the color printer 10 of FIG. 1, when the thermal head 90 is substituted for a driving head, similarly to the second embodiment. The image formed on the ink ribbon 20 is also a real image viewed from the thermal head 90, which is the same as the image recorded on the recording sheet 19.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese patent application No. 10-20324 (filed on Jan. 16, 1998) which is expressly incorporated herein, by reference, in its entirety.

What is claimed is:

1. An image transfer apparatus that records an image through selective heat and pressure application, comprising:

an image generating unit that includes an image carrying member and a layer of micro-capsules containing dye, each micro-capsule disposed in said layer of micro-capsules exhibiting a temperature/pressure characteristic such that, when said each micro-capsule is squashed under a corresponding predetermined pressure at a corresponding predetermined temperature, said dye seeps from said squashed micro-capsule and transfers to a surface of said image carrying member; and an image transfer unit that transfers said transferred dye as said image to a recording surface of a recording sheet, said image transfer unit configured to apply a pressure greater than said corresponding predetermined pressure to the recording sheet.

2. The image transfer apparatus of claim 1, wherein a shell wall of said each micro-capsule is composed of a shape memory resin exhibiting a glass-transition temperature corresponding to said corresponding predetermined temperature, and a thickness of said shell wall corresponding to said corresponding predetermined pressure.

3. The image transfer apparatus of claim 1, further comprising a pressing unit that presses said recording surface of said recording sheet such that said recording surface is smoothed to improve a quality of said transferred image.

4. The image transfer apparatus of claim 1, further comprising a pressure application system that locally applies a predetermined pressure to said micro-capsule layer, at least one of said predetermined pressures being said corresponding predetermined pressure;

a heat application system that selectively and locally heats said micro-capsule layer to predetermined temperatures, at least one of said predetermined temperatures being said corresponding predetermined temperature;

a capsule holding member that holds said layer of micro-capsules; and a recording sheet transport unit that moves said recording sheet in a transport direction.

5. The image transfer apparatus of claim 4, wherein said image generating unit selectively and locally squashes and breaks said micro-capsules between said image carrying member and said capsule holding member in accordance with a control of said heat application system and said pressure application system.

6. The image transfer apparatus of claim 5, wherein said image carrying member comprises a continuous belt and said image generating unit includes a rotational drive system rotationally driving said continuous belt.

7. The image transfer apparatus of claim 6, wherein said image generating unit comprises a support member for supporting said capsule holding member and said image carrying member during said application of said predetermined pressures and temperatures.

8. The image transfer apparatus of claim 7, wherein said image transfer unit comprises a roller that rotates in synchronization with a movement of said continuous drive means, said roller pressing said recording sheet to resiliently contact said image carrying member such that said transferred dye is accurately transferred to said recording sheet as said image.

9. The image transfer apparatus of claim 5, wherein said image carrying member comprises a platen roller and said image transfer unit includes a rotational drive system rotationally driving said platen roller in synchronization with said movement of said recording sheet and a second roller, said second roller pressing said recording sheet to resiliently contact said image carrying member such that said transferred dye is accurately transferred as said image to said recording sheet.

10. The image transfer apparatus of claim 4, wherein said capsule holding member is disposed on said image carrying member and said image generating unit further includes an adhesion preventing member coated with a releasant that prevents adhesion of said transferred dye, said image generating unit selectively and locally squashing and breaking said micro-capsules between said image carrying member and said adhesive preventing member in accordance with a control of said heat application system and said pressure application system.

11. The image transfer apparatus of claim 10, wherein said image carrying member includes a transport drive system that drives said image carrying member so that said transferred dye is transferred as said image to said recording surface of said recording sheet, said image carrying member being in resilient contact with said adhesion preventing member such that said adhesion preventing member rotates in synchronization with said image carrying member.

12. The image transfer apparatus of claim 11, wherein said image transfer unit comprises a rotating member that rotates in synchronization with said image carrying member, said rotating member pressing said recording sheet to resiliently contact said recording surface with said capsule holding member such that said transferred dye is accurately transferred as said image to said recording surface.

13. The image transfer apparatus of claim 1, wherein said pressure greater than said corresponding predetermined pressure is sufficient to squash all micro-capsules of the recording sheet, regardless of temperature.

14. An image transfer apparatus for recording an image through selective heat and pressure application, comprising:

a conveyor unit that intermittently moves a recording sheet in a transport direction; an ink-transfer ribbon that comprises a base member and a layer of micro-capsules, coated over said base member, that contains a plurality of micro-capsules filled with dye, a shell wall of each micro-capsule of said plurality of micro-capsules being composed of resin that exhibits a temperature/pressure characteristic such that, when said each micro-capsule is squashed under a corresponding predetermined pressure at a corresponding predetermined temperature, said dye discharges from said squashed micro-capsule;

a thermal head unit, performing a line by line printing operation on said base member in a recording direction substantially perpendicular to said transport direction, that includes a temperature application unit selectively and locally heating said layer of micro-capsules to predetermined temperatures and a pressure application unit locally applying predetermined pressures to said layer of micro-capsules, said predetermined temperatures including said corresponding predetermined temperature and said predetermined pressures including said corresponding predetermined pressure;

a continuous belt having a smooth outer surface that resiliently contacts said layer of micro-capsules and said recording surface of said recording sheet, said continuous belt moving in synchronization with said movement of said recording sheet such that said transfer of said image to said recording surface of said recording sheet occurs; and an image transfer unit that transfers said discharged dye as said image to a recording surface of a recording sheet, said image transfer unit configured to apply a pressure greater than said corresponding predetermined pressure.

15. The image transfer apparatus of claim 14, wherein said plurality of micro-capsules filled with dye comprises at least three types of micro-capsules having a different shell wall breaking under said corresponding predetermined pressure at said corresponding predetermined temperature and a corresponding different color dye.

16. The image transfer apparatus of claim 14, wherein said pressure greater than said corresponding predetermined pressure is sufficient to squash all micro-capsules of said recording sheet, regardless of temperature.

17. An image transfer apparatus that records an image through selective heat and pressure application, comprising:

a conveyor unit that moves a recording sheet in a transport direction;

an ink-transfer ribbon that comprises a base member and a layer of micro-capsules, coated over said base member, that contains a plurality of micro-capsules filled with dye, a shell wall of each of said plurality of micro-capsules being composed of a resin that exhibits a temperature/pressure characteristic such that, when said each micro-capsule is squashed under a corresponding predetermined pressure at corresponding predetermined temperature, said dye discharges from said squashed micro-capsule and transfers as said image to a recording surface of said recording sheet;

a thermal head unit, performing a printing operation on said base member, that includes a temperature application unit selectively and locally heating said layer of micro-capsules to predetermined temperatures and a pressure application system locally applying predetermined pressures to said layer of micro-capsules, said predetermined temperatures including said corresponding predetermined temperature and said predetermined pressures including said corresponding predetermined pressure; and a rotating member having a smooth outer surface that resiliently contacts said layer of micro-capsules and said recording surface of said recording sheet, said rotating member moving in synchronization with said movement of said recording sheet such that said transfer of said image to said recording surface of said recording sheet occurs, said rotating member configured to apply a pressure greater than said corresponding predetermined pressure to said recording sheet.

18. The image transfer apparatus of claim 17, wherein said plurality of micro-capsules filled with dye comprises at least three types of micro-capsules having a different shell wall breaking under said corresponding predetermined pressure at said corresponding predetermined temperature and a corresponding different color dye.

19. The image transfer apparatus of claim 17, wherein said thermal head is tangentially aligned with said rotating member such that said predetermined pressures are applied by said pressure application system due to said alignment.

20. The image transfer apparatus of claim 17, wherein said conveyor unit intermittently moves said recording sheet, and said thermal head performs a line by line printing operation on said base member in a recording direction substantially perpendicular to said transport direction.

21. The image transfer apparatus of claim 17, wherein said thermal head and said ink-transfer ribbon extend in parallel across substantially a width of said recording sheet.

22. The image transfer apparatus of claim 17, wherein said pressure greater than said corresponding predetermined pressure is sufficient to squash all micro-capsules of said recording sheet, regardless of temperature.

23. An image transfer apparatus for recording an image through selective heat and pressure application, comprising:

a conveyor unit that moves a recording sheet in a transport direction; an ink-transfer ribbon that comprises a base member and a layer of micro-capsules, coated over said base member, that contains a plurality of micro-capsules filled with dye, a shell wall of each micro-capsule of said plurality of micro-capsules being composed of a resin that exhibits a temperature/pressure characteristic such that, when each of said plurality of micro-capsules is squashed under a corresponding predetermined pressure at a corresponding predetermined temperature, said dye discharges from said squashed micro-capsule and transfers as said image to a recording surface of said recording sheet;

a thermal head unit, performing a printing operation on said base member, that includes a temperature application unit selectively and locally heating said layer of micro-capsules to predetermined temperatures and a pressure application system locally applying predetermined pressures to said layer of micro-capsules, said predetermined temperatures including said corresponding predetermined temperature and said predetermined pressures including said corresponding predetermined pressure;

a first rotating member having a releasant coated outer surface that resiliently contacts said ink-transfer ribbon as a part of said pressure application system; and a second rotating member that resiliently contacts said layer of micro-capsules to said recording surface of said recording sheet, said second rotating member moving in synchronization with said movement of said recording sheet such that said transfer of said image to said recording surface of said recording sheet occurs, said second rotating member configured to apply a pressure greater than said corresponding predetermined pressure to said recording sheet.

24. The image transfer apparatus of claim 23, wherein said thermal head is tangentially aligned with said first rotating member such that said predetermined pressures are applied by said pressure application system due to said alignment.

25. The image transfer apparatus of claim 23, wherein said conveyor unit intermittently moves said recording sheet, and said thermal head performs a line by line printing operation on said base member in a recording direction substantially perpendicular to said transport direction.

26. The image transfer apparatus of claim 23, wherein said thermal head and said ink-transfer ribbon extend in parallel across substantially a width of said recording sheet.

27. The image transfer apparatus of claim 23, wherein said plurality of micro-capsules filled with dye comprises at least three types of micro-capsules having a different shell wall breaking under said corresponding predetermined pressure at said corresponding predetermined temperature and a corresponding different color dye.

28. The image transfer apparatus of claim 23, wherein said pressure greater than said corresponding predetermined pressure is sufficient to squash all micro-capsules of said recording sheet, regardless of temperature.

* * * * *